US012651370B2

(12) United States Patent
Maryan et al.

(10) Patent No.: US 12,651,370 B2
(45) Date of Patent: Jun. 9, 2026

(54) INTERFACE FOR DIGITIZATION AND DETECTION OF RIP CURRENTS WITHIN OPTICAL IMAGERY BY WAY OF A FUZZY SET

(71) Applicant: The Government of the United States of America, as represented by the Secretary of the Navy, Arlington, VA (US)

(72) Inventors: Corey Maryan, Bush, LA (US); Christopher Michael, Covington, LA (US); Steven Dennis, Covington, LA (US); Sarah Trimble, New Orleans, LA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 311 days.

(21) Appl. No.: 18/112,472

(22) Filed: Feb. 21, 2023

(65) Prior Publication Data

US 2023/0267643 A1 Aug. 24, 2023

Related U.S. Application Data

(60) Provisional application No. 63/312,466, filed on Feb. 22, 2022.

(51) Int. Cl.
*G06T 7/73* (2017.01)
*G01C 13/00* (2006.01)

(52) U.S. Cl.
CPC .............. *G06T 7/73* (2017.01); *G01C 13/006* (2013.01); *G06T 2207/10032* (2013.01); *G06T 2207/20061* (2013.01); *G06T 2207/20081* (2013.01)

(58) Field of Classification Search
CPC ............ G06T 7/73; G06T 2207/10032; G06T 2207/20061; G06T 2207/20081; G01C 13/006; G06V 10/44; G06V 10/763
(Continued)

(56) References Cited

U.S. PATENT DOCUMENTS

| | | | | |
|---|---|---|---|---|
| 6,931,144 B2 * | 8/2005 | Perrier | ................... | G06V 20/00 |
| | | | | 382/165 |
| 2005/0271266 A1 * | 12/2005 | Perrier | ................... | G06V 20/52 |
| | | | | 348/161 |

FOREIGN PATENT DOCUMENTS

| | | | | | |
|---|---|---|---|---|---|
| CA | 1334214 | * | 1/1995 | .............. | G01V 1/32 |
| CN | 110674980 | * | 1/2020 | ............. | G06Q 10/40 |
| CN | 113658067 | * | 11/2021 | .............. | G06T 5/73 |

* cited by examiner

*Primary Examiner* — Jerome Grant, II
(74) *Attorney, Agent, or Firm* — US Naval Research Laboratory; Nigel R. Fontenot

(57) ABSTRACT

A method of identifying a rip current that includes receiving an image comprising a body of water, and identifying, in the image an estimated location of a rip current associated with the body of water, wherein the identification comprises a plurality of displayed vertices based on least one of a rip length or a rip width. The method may include digitizing the estimated location of the rip current, the estimated location having highest, lower, and no confidence boundaries. The method may include generating, based on the digitized estimated location, a set of fuzzy-set scheme labels for one or more pixels in the image based on a respective confidence boundary, where the fuzzy-set scheme labels are based on a pixel interpolation associated with the lower confidence boundary, and generating, based on the generated fuzzy-set scheme labels, a refined digitizing of the estimated location of the rip current.

16 Claims, 14 Drawing Sheets

(58) Field of Classification Search
USPC .......................................................... 382/103
See application file for complete search history.

The geometric interface is shown in Fig. 1A with the designated ray's crisp labeling shown as the dotted line and fuzzy labeling shown as the solid line in Fig. 1B.

Three fuzzy-set labels are shown in Fig. 2A: One generated directly from the model, a less correct labeling A, and a further less correct labeling B. When introducing noise to each of the different labels, it may be observed that the mean error shown in Fig. 2B conflates the different labels while the goodness-of-fit approach shown in Fig. 2C maintains their distinction.

Three fuzzy-set labels are shown in Fig. 2A: One generated directly from the model, a less correct labeling A, and a further less correct labeling B. When introducing noise to each of the different labels, it may be observed that the mean error shown in Fig. 2B conflates the different labels while the goodness-of-fit approach shown in Fig. 2C maintains their distinction.

Three fuzzy-set labels are shown in Fig. 2A: One generated directly from the model, a less correct labeling A, and a further less correct labeling B. When introducing noise to each of the different labels, it may be observed that the mean error shown in Fig. 2B conflates the different labels while the goodness-of-fit approach shown in Fig. 2C maintains their distinction.

Images show that combination of fuzzy-set labeling and feature optimization may yield accurate results for rip classification.

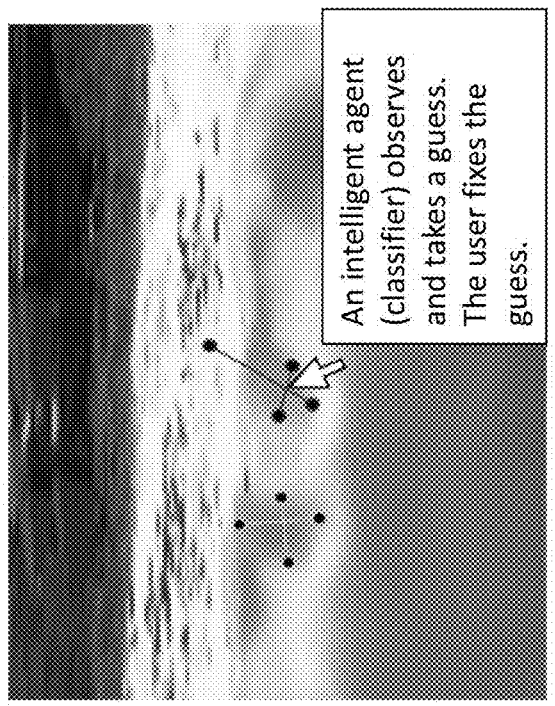
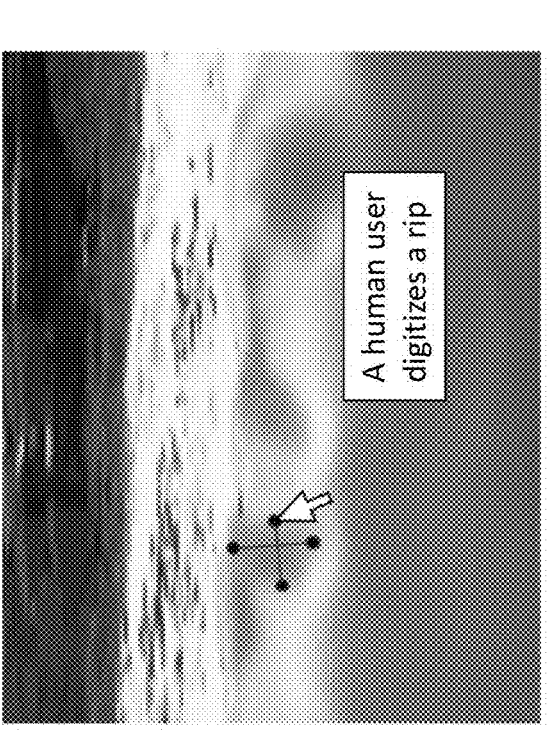
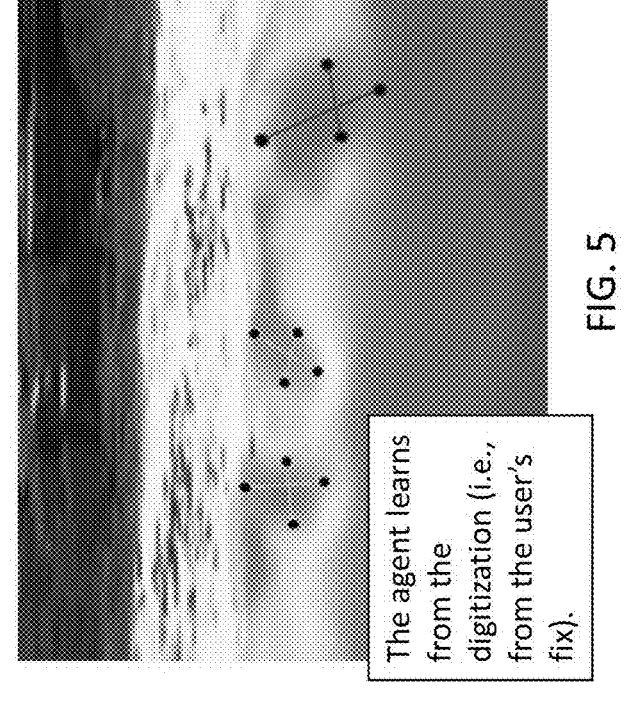
FIG. 5

Root: The pixels along this curve get labeled 0.0

Threshold: The pixels along this curve get labeled 0.5

Cross Point: This pixel gets labeled 1.0

Algorithm 1: Fuzzy-Set Labeling

```
1  Function LabelIfFuzzy(Im, AB̄, C̄D̄, c > 1):
2      C_rep ← CreateNewLabel(Im);
3      C_o ← C_rep;
4      P ← AB̄ ∩ C̄D̄;
5      C_o(P) ← 1;
6      γ_r ← Connect(A, C, P) ∪ Connect(A, D, P) ∪ Connect(B, C,
          P) ∪ Connect(B, D, P);
7      C_o(γ_r) ← 0;
8      γ_r ← scale γ_r about P by c;
9      C_o(γ_r) ← −1;
10     foreach L⃡ ∈ L⃡ ∩ P do
           // space-ordered list of pixels
11         f ← C_o ∩ L⃡;
12         foreach j ∈ f do
13             C_rep(j) ← Interpolate(f, j);
14     return C_rep;
15 Function Connect(X, Y, P):
16     P' ← reflect P about X̄Ȳ;
17     return DrawBezierCurve(X, Y, P')
```

FIG. 7

Table 1—Feature Spaces

| ID | Operation | Set | Parameters |
|----|-----------|-----|------------|
| a | Red | Base | N/A |
| | Green | Base | N/A |
| b | Blue | Base | N/A |
| | Brightness | Base | N/A |
| | PixelColumn | Base | N/A |
| | PixelRow | Base | N/A |
| c | ScaleSpace(a) | Optimized | $t = 0.87$ |
| | PixelRow | Optimized | N/A |
| | PixelColumn | Optimized | N/A |
| | ScaleSpace(b) | Optimized | $t = 86.74$ |
| | Gabor(a) | Optimized | $\sigma = 1.0, \theta = 168.45, \lambda = 41.81, \psi = 55.82$ |
| d | Gabor(c) | Optimized | $\sigma = 1.0, \theta = 4.74, \lambda = 40.61, \psi = 33.48$ |
| | Gabor(d) | Optimized | $\sigma = 1.0, \theta = 120.42, \lambda = 9.45, \psi = 80.74$ |

FIG. 9

Table 2—Error versus Goodness of Fit

| Label Set | Feature Set | Detection | 1/MAE | 1/RMSE | CoD |
|---|---|---|---|---|---|
| Crisp | Base | False Positive | 0.78 | 0.71 | 0.36 |
| Crisp | Base | True Positive | 0.71 | 0.58 | -0.29 |
| Crisp | Optimized | False Positive | 0.71 | 0.63 | 0.15 |
| Crisp | Optimized | False Positive | 0.75 | 0.70 | 0.50 |
| Crisp | Optimized | True Positive | 0.74 | 0.71 | 0.59 |
| Fuzzy | Base | False Negative | 0.85 | 0.82 | -0.02 |
| Fuzzy | Optimized | True Positive | 0.89 | 0.85 | 0.76 |

FIG. 10

INTERFACE FOR DIGITIZATION AND DETECTION OF RIP CURRENTS WITHIN OPTICAL IMAGERY BY WAY OF A FUZZY SET

CROSS-REFERENCE

This Application is a nonprovisional application of and claims the benefit of priority under 35 U.S.C. § 119 based on U.S. Provisional Patent Application No. 63/312,466 filed on Feb. 22, 2022. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #210939.

TECHNICAL FIELD

The present disclosure is related to the detection of rip currents, and more specifically to, but not limited to machine-assisted digitization and labeling of rip current samples from imagery via use of a fuzzy set.

BACKGROUND

Rip currents are widely studied by oceanographers throughout the Navy because of their potential danger and relationship to both bathymetry and climate. Although optical images of these phenomena serve as viable data when in-situ methods are unavailable or financially inefficient, they must first be prepared through manual digitization and annotation. This process can be laborious when there are large datasets due to the amount of labor involved in analyzing hundreds or thousands of images for a climate study. Digitization of rips from imagery has a well-known subjectivity aspect due to the fuzzy boundaries of rip channels and anomalous variations in imagery; however, studies have shown that most scientists may reach a general consensus for the vast majority of rips identified from images.

The current state of the art conducts rip-current digitization by either using center point demarcation (single control point) or orthogonal bounding-box demarcation (two control points). These techniques focus on either completely manual digitization, or digitization for the purpose of convolutional neural networks, which require orthogonal bounding box demarcations.

Unlike the present disclosure, prior techniques are not able to digitize the dimensions and orientation (length, width, angle, and the like) of a rip current. Additionally, prior techniques do not yield good interactive machine-learning implementations due to their inaccuracies.

Because of these shortcomings in the art, there exists a need for a solution for improved rip current detection.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Disclosed aspects provide for a novel method for rip current digitization that allows for accurate measurement of rips by placement of one or more (e.g., four) control points. This technique allows for a less laborious digitization at little-to-no loss in precision. Disclosed aspects provide for a model for the labeling of imagery, given a rip digitization that takes into account the subjective nature of rip digitization from imagery. The present disclosure shows the effectiveness the novel aspects by demonstrating an interactive machine-learning approach to automatic rip digitization that very quickly converges on accuracy by using the novel approach.

The present disclosure provides for a method of identifying a rip current. The method may include receiving, by a computing device, an image comprising a body of water, identifying, by the computing device, in the image an estimated location of a rip current associated with the body of water, wherein the identification comprises a plurality of displayed vertices based on least one of a rip length or a rip width, and digitizing, by the computing device and based on the displayed vertices, the estimated location of the rip current, the estimated location comprising a highest confidence boundary, a lower confidence boundary, and a no confidence boundary. The method may include generating, by the computing device and based on the digitized estimated location, a set of fuzzy-set scheme labels for one or more pixels in the image based on a respective confidence boundary, wherein the fuzzy-set scheme labels are based on a pixel interpolation associated with the lower confidence boundary, and generating, by the computing device and based on the generated fuzzy-set scheme labels, a refined digitizing of the estimated location of the rip current associated with the body of water.

BRIEF DESCRIPTION OF THE DRAWINGS

FIG. 5 illustrates example training in accordance with disclosed aspects.

FIG. 7 illustrates an example algorithm in accordance with disclosed aspects.

FIG. 9 illustrates an example table in accordance with disclosed aspects.

FIG. 10 illustrates an example table in accordance with disclosed aspects.

DETAILED DESCRIPTION

Figures 1A, 1B:
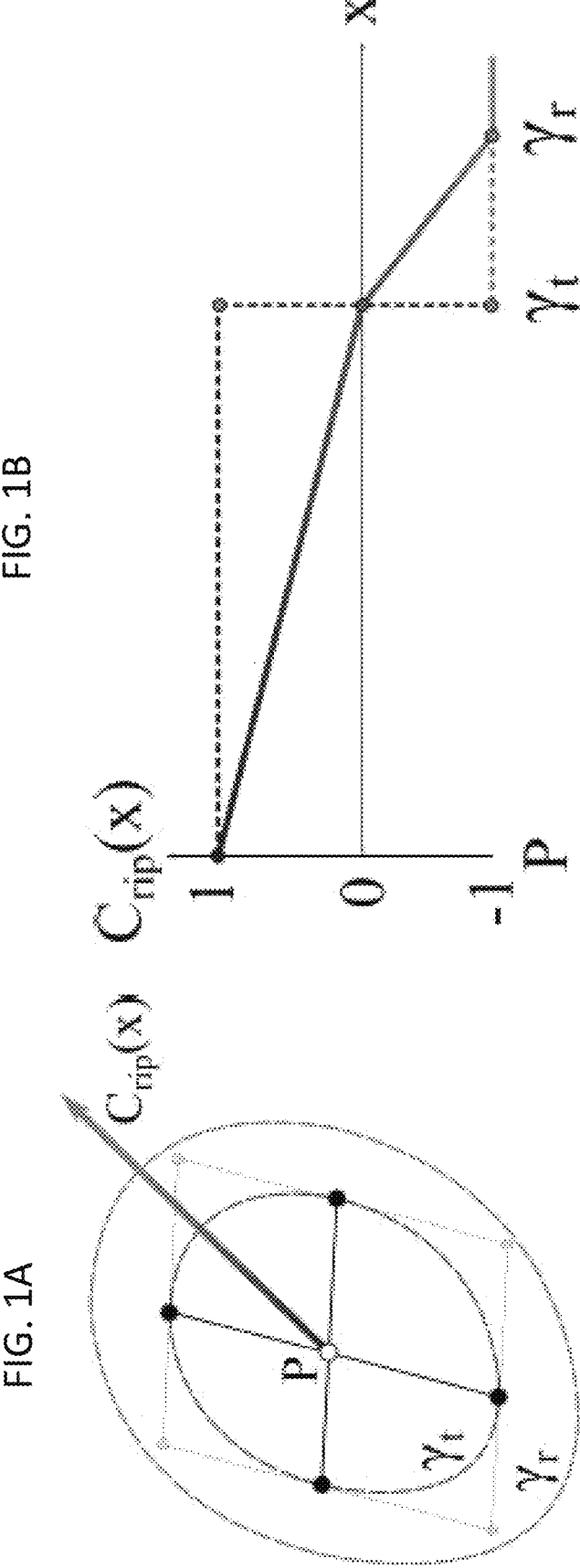
FIG. 1A illustrates an example interface diagram graph in accordance with disclosed aspects.
FIG. 1B illustrates an example interface diagram graph in accordance with disclosed aspects.

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

Disclosed embodiments describe an interface for machine-assisted digitization and labeling of rip currents from images, such as optical images, photographs, satellite images, and/or the like. Because rip current digitization can be somewhat subjective, a method and system fuzzy set model for labeling is described. Such a labeling paradigm may be more suitable for digitizing rips, since it takes subjectivity into consideration. Evidence from an experiment is presented, which supports the effectiveness of the presented rip digitization technique.

There are several techniques for automatic rip current digitization in the current state of the art. However, there are several shortcomings in these techniques. First, these methods do not measure the dimensions of a rip channel, but rather detect rip currents using orthogonal bounding boxes. Second, though some techniques may assist with rip current digitization, none of them are able to immediately learn from a user's adjustment. The interactive techniques in literature that involve image segmentation either rely on a model trained with a large, highly curated dataset or cannot digitize new points automatically. This report presents a human-machine interface for rip current digitization that is able to measure the dimensions of the rip channel. The interface uses a pair of intersecting line segments, one denoting the channel width and one denoting the channel length.

From this cross segment annotation, a rip is labeled using a closed-curve geometry derived from laterally connecting the vertices by Bezier curves. From this geometry, the novel fuzzy labeling scheme assigns full class membership to the pixel on the cross point, or the point at which the two segments intersect, with a linearly fading membership based on the derived closed curve. A methodology for rip detection of the labeling model is presented. This methodology consists of three major steps: orientation detection, initial cross-segment placement, and goodness of fit. A high-performance algorithm for orientation detection based on a partial Hough transform is used to find the angle of the rip channel from a detected cross point. An iterative vertex placement algorithm is then used to initialize the placement of the cross-segment vertices.

A goodness-of-fit metric that optimizes the placement of the vertices is presented. This metric is evaluated and shown to perform better than error-based metrics. A case study is presented for time-averaged shoreline imagery of Duck, N.C. gathered from the Argus dataset. This case study compares a crisp-set labeling to the novel fuzzy-set labeling we propose. The experiment involved training a fuzzy-enabled k-nearest-neighbors machine-learning model on one image containing a single digitized rip.

The presented detection methodology was then used to detect a similar rip in an image taken the following day. The evidence shows that the fuzzy-label model performs much more favorably than the crisp-labeled model, but requires a robust features selection.

1.1 Rip Currents

Rip currents are widely studied by many oceanographers and climatologists because of their hazardous nature and relationship to bathymetry. Nearshore images of rip currents serve as viable data for study when in-situ methods are costly and laborious. However, the process of manually digitizing rip currents can be arduous. Although some experimentation suggests supervised machine learning can help automate this process, these methods do not measure the dimensions of a rip channel like the present embodiments described herein.

The present disclosure provides an interface for machine-assisted digitization and labeling of rip current samples. This interface precisely captures the length and width of a rip current using a set of crossing line segments. The pixels of a rip digitization are then labeled according to a geometric model built from these segments. When studied as features in imagery, rip currents have a level of subjectivity in digitization.

The present disclosure provides for a novel pixel-based labeling scheme based on fuzzy-set theory that may take into account this subjectivity with an implicit model of uncertainty. A naïve labeling scheme can be compared to the novel fuzzy scheme to illustrate the advantages of the present disclosure.

The present disclosure can be used to digitize rip currents through the manipulation of two (2) crossing line segments. The present disclosure may use one (1) segment for width and one (1) segment for height to precisely capture the physical dimensions of a rip current in optimal imagery. Once annotation is finished for a rip, Bezier curves are closed around the segment endpoints. These closed curves model a novel fuzzy membership scheme for labeling the image pixels. This scheme labels pixels of the digitization such that membership fades from the cross point, or the point at which the placed line segments cross. The orientation of the rip may then be attained by using the angles of its segment digitization or through feature extraction of the derived fuzzy labeling. In some embodiments, a pixel's membership may be referred to as ownership.

The present disclosure improves over the current methods in a number of ways. First, the present disclosure provides a digitization that measures the width, height, and orientation of a rip. Second, the present disclosure provides a model for labeling the pixels in an image corresponding to a rip by taking into account the imprecise and objective nature of rips. One or more disclosed techniques used in an interactive machine learning system for detecting rips greatly improves results over prior digitization techniques.

Rip currents, or simply rips, are narrow water currents that flow away from shore through the surf zone of a beach, especially when breaking wave activity is high. Rips are a widely studied phenomena for oceanographers, geologists, and climatologists because of their hazardous nature and relationship to littoral bathymetry [1-3]. Persistent shoreline imagery may serve as a viable data source for the study of rips due to the visibility of common rips on the water's surface, the high cost of specialized instrumentation, and laborious effort involved with in-situ measurement [4]. Though minimal processing of still imagery is required to identify channel rips, which involve channels in littoral bathymetry, the process of manually searching for and digitizing rips in a large dataset can be long and arduous [5].

Some experimentation suggests that supervised machine learning can help automate this process given a large amount of prior labeled data [6]. However, state-of-the-art techniques work only to detect and not to measure the dimensions of rips. The length and width of a rip are controlled by the incoming wave field and the underlying bathymetry [7]. Detecting how the rip's length and width change through consecutive images can reveal critical information about the wave field and bathymetry during that time. Although in-situ instruments have been used to collect information about the currents, waves, and bathymetry around rips [8-11], such instruments are logistically and financially complicated to deploy. Additionally, they return observations from only their discrete location. Detecting the full 2-dimensional location of present rips is one of the primary advantages of using remotely sensed imagery detection [12].

To address the shortcomings of current supervised approaches, an interface for the digitization and labeling of rips within optical imagery is presented. The digitization interface consists of a pair of crossing line segments; one segment marks the length of the rip while the other marks the width. Because the nature of digitizing rips from imagery is somewhat subjective, a fuzzy-set based pixel labeling is presented to support more subjective digitization [13, 14]. This technique diminishes the degree of each pixel's ownership to a rip class with respect to the intersection point of the crossing line segments and an implicit closed-curve geometric model. Additionally, an uncertainty model and detection algorithm based on the fuzzy-set model is presented. Evidence described herein shows the effectiveness of the novel model for pixel-based supervised learning is given.

2.1 Rip Digitization

Still imagery and video have been used to study near shore geomorphology for decades. In 1989, it was shown by Lippmann and Holman that collecting time-exposed, averaged samples of remotely sensed shoreline video provide suitable measurements to study sand bar morphology [15]. Since then, numerous studies have used this technique to specifically study rip currents in the near shore. Rips may be digitized in different ways depending on the application and field of study. Points are used to denote rips by Holman et al. for the study of spacing and persistence [1]. The study shows evidence for adequate consistency between two individuals performing manual point-based digitization when counting rips, but also suggests subjectivity may be involved since the a small number of positive denotations varied between individuals. The study of near-shore bathymetry and sediment transport has higher correlation to the size and shape of the rip, and so a simple point digitization is not sufficient [16]. The width and length of a rip current varies within known ranges controlled by the wave conditions present [7]. One of the defining characteristics of a rip current is its narrow and focused offshore flow. Using width to digitize imagery features is critical to rip labeling while avoiding darker shapes caused by other phenomena, such as wide depressions in the nearshore bathymetry, which would not generate a rip.

2.2 Interactive Segmentation

Due to the high breadth and depth of object segmentation and digitization from imagery, we limit the scope for state-of-the-art comparison to those techniques where results may be corrected interactively. Such implementations are more conducive to an effective implementation using the digitization techniques presented in this study. Research in this type of interactive digitization is prominent within the fields of medical analysis, geographic land-cover classification, and semantic labeling. A fairly recent technique by Wang et al. allows the user to scribble in the image being segmented with a pixel-wise binary labeling to fine-tune results when the classification is incorrect [17]. Though this technique does allow for some level of interactivity, the refinement is indirect: The user does not directly correct the digitization, but provides more labeled examples to the model in hopes to improve the digitization. The technique presented by Spina et al. allows for more direct manipulation of the segmentation by use of markers and anchor points for guiding the segmentation [18]. However, this approach relies on human interaction to initialize the process, and thus does not have the ability to digitize new data points automatically. Polygon-RNN and Curve-GCN provide a contour-based segmentation technique where vertex placement of the contour is modeled as a recurrent process in the former study and a regression in the latter study [19, 20]. Though these techniques allow for direct correction through vertex control points, they mainly differ from the technique we present in that they both use a model trained on a large and highly curated street-scene dataset consisting of many thousands of labeled examples. Though cross-domain applications are presented, results for the less-salient boundary objects of brain tissue scans performed the poorest. Moreover, the interactive techniques rely on a bounding box to be manually drawn around the object of interest by the user. Grabber was recently presented as a tool for interactive image segmentation that focuses on improving the human-computer interface for segmentation [21]. This technique is meant to supplement an existing interactive segmentation algorithm by providing anchor points along the contour that a user may create or move to provide constraints to the contouring algorithm. Though Grabber is relevant in that its interface allows for direct human correction, the interface is much less constrained, and hence less specialized, than our approach. Additionally, because a rip is an area of offshore directed current, Grabber's contouring algorithm may prove troubling for the somewhat malleable and sometimes subjective boundaries of the field of flow as captured by still images.

2.3 Automatic Rip Detection and Digitization

Several techniques in the literature have attempted to digitize rips from still images automatically. Gallop et al. presented an algorithmic approach that digitized rip currents by searching for color-derived minima along cross-shore and alongshore transects within the surf zone. Some manual post processing of the data was required [22]. Gallop et al. enhanced the algorithm by providing a semi-automatic interface, allowing a user to correct the pixel-based labeling [23]. Pitman et al. present techniques for filtering images to yield more visually salient rips [3]. None of these techniques are optimized by the user's corrections, and thus may require manual parameterization for a more generalized dataset. In 2019, we presented a refined technique for rip current detection through supervised machine learning, but the study was performed over a single dataset and there was a high overhead in creating a labeled training set [6]. Moreover, the study presented techniques only for detection via bounding box and not digitization. Rashid et al. used the same dataset to study how deep nets may be optimized to yield higher accuracies for detection of rips [24]. To the best of our knowledge, no study to date presents a semi-automatic rip digitization technique constrained to a well-defined Cartesian geometry. Furthermore, no study has presented a fuzzy-set based labeling approach to rip digitization that allows for inherent uncertainty.

Figure 6:
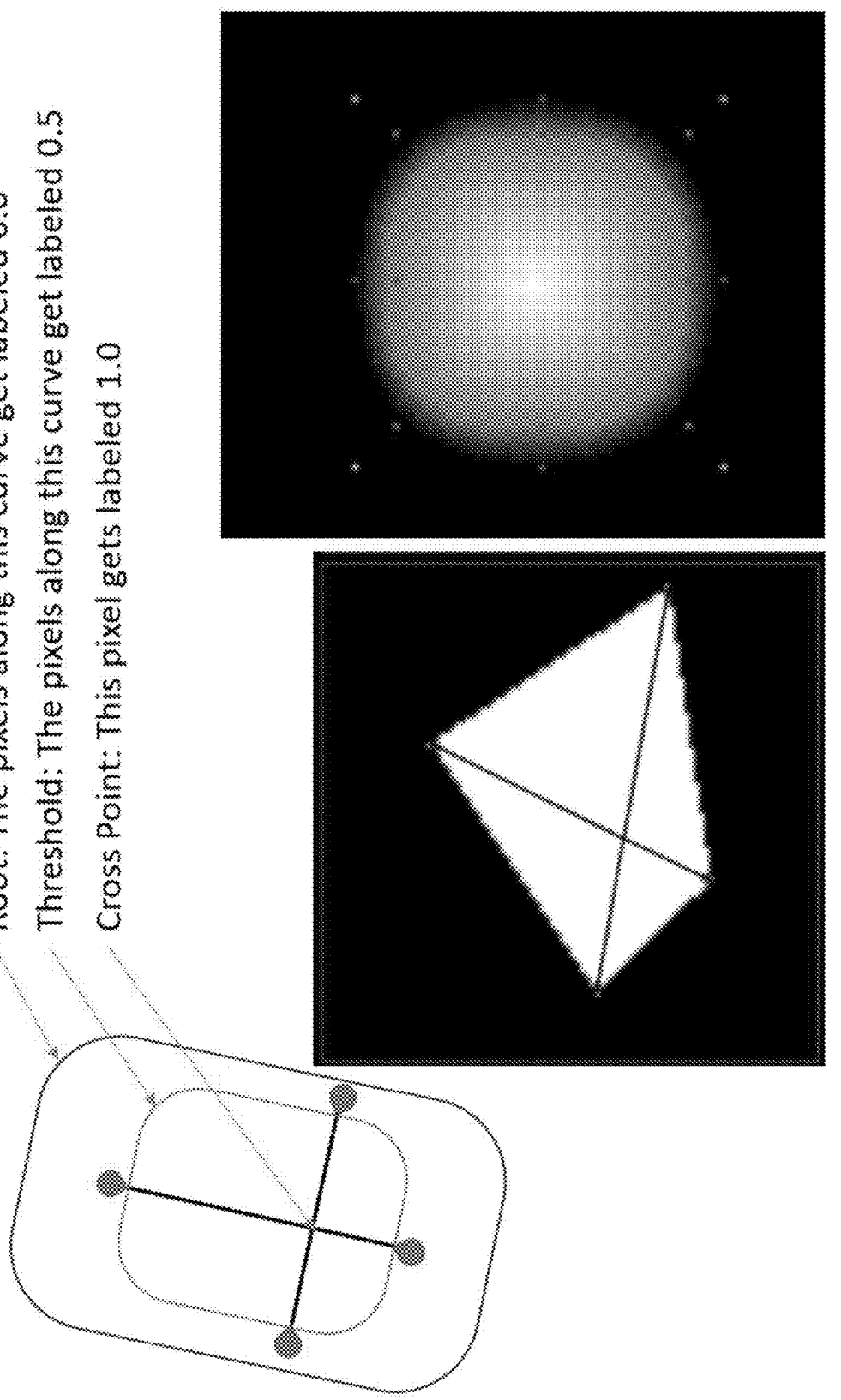
FIG. 6 illustrates example training in accordance with disclosed aspects.

FIGS. 5 and 6 illustrate one or more example implementations of a User Machine Interface in accordance with disclosed aspects and described herein. Additional details are described in the below reduction to practice examples, such as with respect to FIG. 4.

Aspects described herein include the use of machine learning and/or training (e.g., as described above and/or hereinafter), such as shown in FIGS. 5 and 6. According to some aspects, a computing device (e.g., via a processing device and/or interface) may receive and/or take images or CSV datasets. In some embodiments, an Annotation tool may be used to perform annotation on the images/datasets. For example, an annotation tool may include a named label (rip channels) and a classifier.

User Machine Interface (Annotation)—According to some aspects, rip channels may be annotated with 4 movable vertexes (2 width and 2 height). An accurate vertex placement is ab overall goal of the annotation tool. In some cases, a bounding box may limit a pixel search algorithm when the classifier is used to place vertexes.

User Machine Interface (Vertex Placement)—According to some aspects, a user may click (or other input) within a rip channel to set the cross point. Vertexes may be placed by finding the rip channel boundary to surf zone with a classifier.

User Machine Interface (Machine Learning)—According to some aspects, a classifier is trained as the user annotates. This may include Online learning, and the like. For example, a vertex may be placed by classifier, the user can adjust the placed vertex, and then the classifier may be trained based on the adjustment.

User Machine Interface (Fuzzy Training)—According to some aspects, disclosed fuzzy training and classification may be implemented using a 2 class problem, with training and classifying values between 0.0 and 1.0: 1.0=rip channel (White); 0.5=uncertain (Grey); and 0.0=outside rip channel (Black). In some embodiments, these values may be generated through linear interpolation.

User Machine Interface (Curve and Membership Functions)—Disclosed embodiments may use a Bezier curve function to generate a curved shape of each rip channel boundary. Linear interpolation may be used to generate class memberships, with fading of class values from 1.0 to 0.0 as the distance increases (white to black).

User Machine Interface (Label Application)—According to some aspects, when the annotation is finished, the label is applied. Some or all of the pixels in the image may be assigned a class membership. Pixels inside bounding boxes may be given fuzzy membership. The classifier may be trained with the class memberships in image other than 0.0. In some cases a random percentage (e.g., 1%) of all 0.0 memberships are also included in the training.

User Machine Interface (Auto Annotation)—According to some aspects, the classifier may be trained for auto annotation, which may use online learning. This process may be similar to semi-automated annotation, but may use automatic initialization and orientation (i.e., no user clicks).

User Machine Interface (Auto Initialization)—According to some aspects, a sample of pixels outside of bounding boxes may be classified. An initial pixel with the highest class membership (>0.5) may be chosen, and a search 5×5 kernel around center may be used. If a pixel in the kernel has higher membership, that pixel is chosen as new kernel center, and the search is repeated. If a pixel in the kernel does not have a higher membership, the initial pixel is chosen as cross point.

User Machine Interface (Auto Orientation)—One or more disclosed embodiments may be based on partial Hough transforms. For example, one or more disclosed embodiments may uses ray casting from the center point, as described herein. After orientation determined, the classifier may place vertexes within the box, the user may make adjustments, and the algorithm may start again after training.

Optimization may be used to find the best features for annotating a dataset. The Optimization (Input) may include inputting a set of candidate features for optimization. For example, these features may include: X, Y, Red, Green, Blue, Brightness, Gabor Filter, Scale Space, or the like. Sets of label data and images may be input in some cases.

Optimization (Setup) may include training the classifier on labeled data and performing 10-fold cross validation. Evaluation points may be chosen based on one or more user defined metrics. Points can be assigned to rate/evaluate how well features are performing, and in some cases, an equal amounts of positive and negative points may be used.

Optimization (Optimization Round) may include choosing a feature from the list of features, training the classifier with the feature, and performing a 10-fold cross validation. If the feature has input parameters, one or more of the parameters may be searched for optimal values.

The optimizer may be ran for one or more of the datasets. For example, the process may start with one labeled image, and an image is added until performance levels off. Each dataset may be annotated with optimized features. For example, the vertex placement accuracy may indicate (or equal) the correct vertex placements/total placements. According to some aspects, a bump surface may train the classifier as user annotates rip channels. The trained classifier may be used to annotate images with auto annotation with increased accuracy.

Optimization (Parameter Optimization) may include exploring a feature's parameter(s). This can be based on a user set search range. The user can change a value and check for performance increase (and/or decrease). The performance can re-evaluated with 10-fold cross until no increase.

Optimization (Optimization Round) may include selecting a feature with the best performance and add the selected feature to a final set of features. The feature may be input for parameterization. Another round may be started unless the performance does not increase.

According to some aspects, one or more embodiments may employ a labeling scheme (e.g., see FIGS. 1A and 1B, described herein). The labeling scheme may include fuzzy-set scheme that may label one or more (e.g., some or all) pixels in the image with ownership to the rip label: Full ownership ($C\_rip=1$); Partial ownership ($1<C\_rip<-1$); No ownership ($C\_rip=0$). One or more embodiments may set $C\_rip (P)=1$, $C\_rip (\gamma\_t)=0$, $C\_rip (\gamma\_t)=-1$, and may interpolate to yield labeling of the pixels. A cross-segment consisting of four interactive vertices may be used to digitize a rip (one simple human interaction): one segment to measure the rip's length; one segment to measure the rip's width. Implicit geometric primitives may be generated from the cross-segment, where, for example, a cross point P may denote area of rip with highest confidence (e.g., 100% of rip is in pixel); a "threshold" curve $\gamma\_t$ designating the rough boundary of the rip; a "root" curve $\gamma\_r$ designating pixels of the image completely outside of the rip. An example of this can be, for example, shown in FIGS. 5 and 6.

3. Methodology 3.1 Geometric Interface

The following geometric notation will be used. A line is symbolized as $\overleftrightarrow{L}$. A ray that starts at some point $P \in \overleftrightarrow{L}$ and extends in some designated positive direction is represented as $\overrightarrow{PL}$ and the ray $\overleftarrow{PL}$ extends in the negative direction such that $\overrightarrow{PL} \cap \overleftarrow{PL} = P$ and $\overrightarrow{PL} \cup \overleftarrow{PL} = \overleftrightarrow{L}$. A line that intersects points A and B is symbolized as $\overleftrightarrow{AB}$. A segment with endpoints A and B is symbolized $\overline{AB}$. Define a cross S as the set of two intersecting segments where $\overline{AB} \cap \overline{CD} = P$ and P is called a cross point. An image raster is treated as a bounded plane in 2D Euclidean space where some pixel j located at some column, x, and row, y. within the raster is projected to the plane bound by [x,x+1) on the x-axis and [x, y÷1) on the y-axis, Any pixel j is associated with a pixel-level feature vector $\overrightarrow{p}_j \in \mathbb{R}^n$, where n is the number of dimensions in the image's feature space. The feature vector is composed of a features that correspond to the pixel j. We use the set $[j \forall j E \overrightarrow{PL}]$ to denote an ordered set of pixels from the image plane that intersect $\overrightarrow{PL}$ starting with the pixel that intersects P. Digitization Involves demarcation of a rip using a cross S. of which one segment is placed along the center of the rip's neck to measure length and another segment measures the rip's width. Intuitively, the cross-point P is then located at the rip's most prominent center point.

Once a rip is digitized, there are two additional geometric constructs created implicitly from the cross, The threshold, $\gamma_t$, is a closed curve anchored at the segment endpoints of the digitization. Endpoints are laterally connected by a quadratic Bézier curve [25]. The control points of the curve are set by the enclosing trapezoid formed by the segment endpoints as shown by the yellow vertices in FIG. 1a. The roof, $\gamma_r$, is an additional closed curve created by scaling $\gamma_t$ about P by some scaling factor $\geq 1$. We assume P, $\gamma_r$, and $\gamma_t$ do not intersect for a valid rip digitization. These three geometric constructs will be used to define the rip's orthogonal bounding box and the novel fuzzy-set labeling of the underlying pixels.

3.2 Fuzzy-Set Labeling Model

Crisp-set labeling assigns an absolute class membership to its input. For instance, a pixel may only be labeled as belonging to a rip, a positive label, or not belonging to a rip, a negative label. Fuzzy-set classification allows for the input to be labeled with a partial membership to its class. More formally, a fuzzy-set label model M(S) assigns a membership of class label L to feature vector $\overrightarrow{p}_j$ using the membership function $u_L(\overrightarrow{p}_j) \in [-1, 1]$, where $-1$ represents $\overrightarrow{p}_j$ as a full member of the negative label, 1 represents $\overrightarrow{p}_j$ is a full positive member of the label, values $(-1, 0)$ represent shrinking partial membership to the negative label, and values $(0, 1)$ represent growing partial membership to the positive label.

Fuzzy-set based classification has been shown to effectively correlate with classification model uncertainty for class membership and image segmentation [14, 26]. To the best of our knowledge, fuzzy-set labeling as a model for digitization of rip currents specifically for machine-learning models has not been presented until now. Because rip currents identified from imagery do not have clear boundaries, they are difficult to consistently digitize. Crisp labeling of a rip is not ideal since inconsistently labeling these boundaries would yield inaccurate ground truth and may lead to incorrect model overfitting. Likewise, orthogonal bounding-box labeling used in image detection does not provide any accurate digitization for the geometric dimensions of a rip. Therefore, an explicit labeling model that maximizes membership at the cross point of the digitization and fades membership of pixels with respect to the threshold and root curves may improve rip digitization by assigning a lower membership to the more subjective parts of a rip.

Given a cross point P and a threshold $\gamma_t$, the crisp-set labeling sets $C_{rip}(j)=1$ for all pixels j on or inside $\gamma_t$ and sets $C_{rip}(j)=-1$ for all pixels outside of $\gamma_t$. Given the additional curve $\gamma_r$, the fuzzy-set labeling is calculated in the following way. Set label values $C_{rip}(P)=1$, $C_{rip}(\gamma_t)=0$, and $C_{rip}(\gamma_r)=-1$. Consider the set of all rays starting at point P. From P, each ray intersects $\gamma_t$ once and then $\gamma_r$ once. Thus, there are 3 known values Intersecting every ray, and the underlying labeling of the pixels intersecting the ray is considered to be the interpolation of these points as a function of Euclidean distance assuming a range of $[-1, 1]$. Code for this is given in Algorithm 1 using lines instead of rays for optimality. A visual example of fuzzy and crisp labeling for a single ray of the label is shown in FIG. 1b.

3.3 Detection

Because the purpose of the presented fuzzy-set labeling technique is intended for automatic classification via supervised learning, it is important to generate an accurate cross given the fuzzy label of a rip. To simplify the detector, we make the assumption that the length of a rip is noticeably longer than the width of a rip.

3.3.1 Definition

Given a classification raster R with a feature space in $\mathbb{R}^1$ representing some classification of pixels where $\{-1 \leq \overrightarrow{p}_j \leq 1 \forall j \in R\}$, the goal of detection is to find one or more crosses whose placement, which is the location of vertices A, B, C, and D for each cross, minimizes the error between the given image and the labeling generated by the model $W(S_i)$ where i is the optimal number of crosses. Assume for simplicity that the given image contains at most one rip. Then the goal becomes to solve the equation $$D = \underset{A,B,C,D \in S}{\arg\min} E(M_{ri|p}(S), R) \qquad (1)$$

where E is a chosen error function and D represents the best placement of the cross. For an image that may contain more than one rip, the following equation is solved:

$$D = \left| \underset{I, S_0, \dots, S_I}{\arg\min} E(M_{rip}(S_0, \dots, S_I), R) \right. \qquad (2)$$

where M labels each of the crosses of its argument.

Figure 2A:
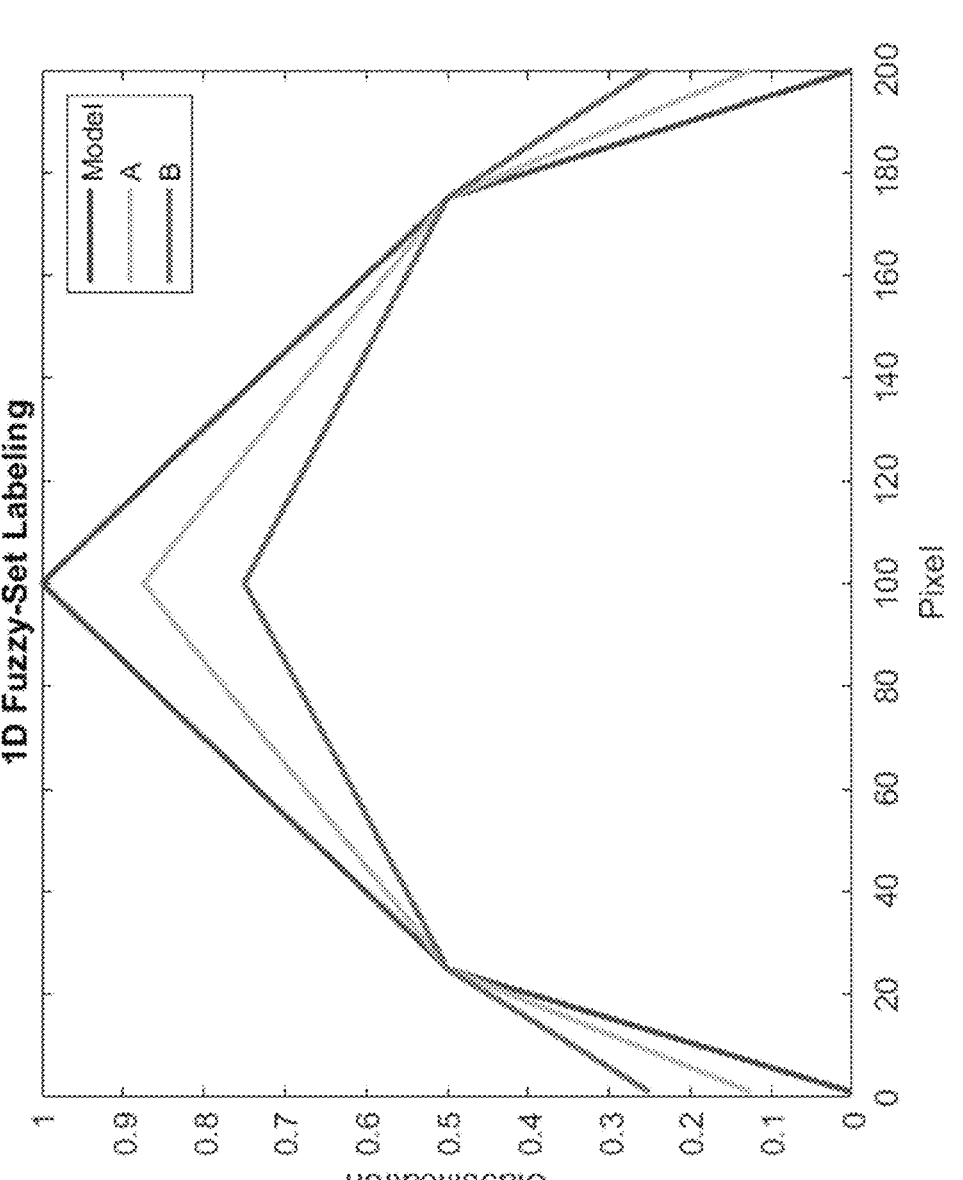
FIG. 2A illustrates an example graph in accordance with disclosed aspects.
Figure 2B:
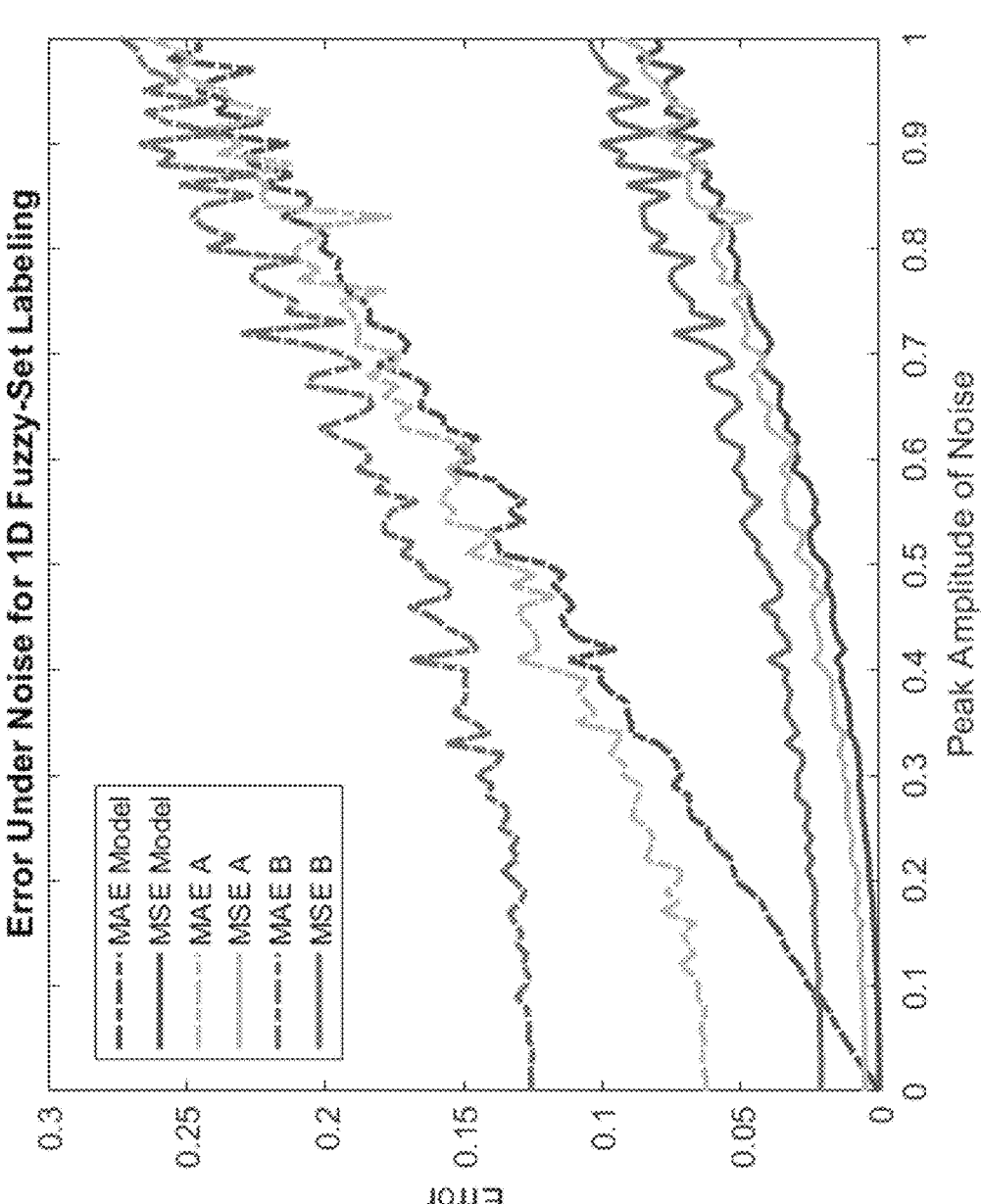
FIG. 2B illustrates an example graph in accordance with disclosed aspects.
Figure 2C:
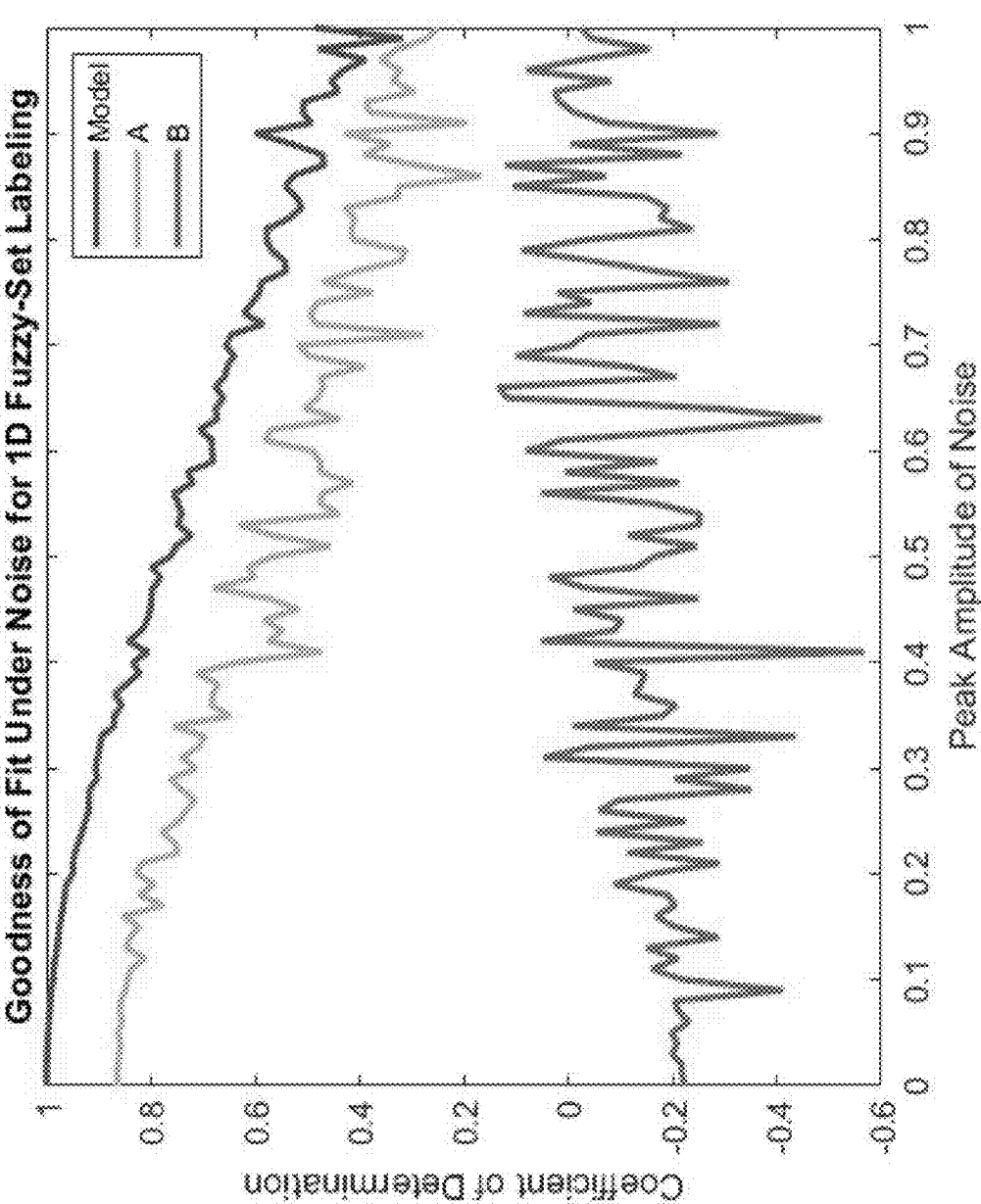
FIG. 2C illustrates an example graph in accordance with disclosed aspects.

Solving this optimal placement is not sufficient for detection of a rip. For example, if the values of R are noise, there is still a cross, D, that best fits the input albeit at a high rate of error. More importantly, error alone does not necessarily correlate to the desirability of a classification against a modeled labeling. Take for instance the 1-dimensional labeling of a rip as shown in FIG. 2A. The series labeled model shows the ideal fuzzy-set labeling of the rip. The series labeled A shows a labeling that is less desirable, or less correct, than the model. Series B shows a labeling that is less correct than series A. Ideally, as noise is introduced into each of these different labels, the measurement of error would correspond to the correctness of the label: model would have the least error, then A, then B. FIG. 2B shows the mean-absolute error (MAE) and root mean squared error (MSE) of each series against the original model with respect to the amplitude of induced noise. It may be observed that the noise begins to conflate the more desirable labels such that model and A are indistinguishable. In order to prevent this conflation, it may be worthwhile to evaluate the correctness of labeling as a predictor of the model series rather than evaluating correctness based on the mean error of the data points. The coefficient of determination, which provides such a basis, is defined in the following way:

$$R^2(M_{rip}(S), P) = \frac{\sum (m_j - \overrightarrow{p_j})}{\sum (m_j - \text{mean}(M_{rip}(S)))} \quad (3)$$

where $\{-1 \le m_j \le 1 \forall j \in M_{rip}(S)\}$. The coefficient of determination evaluates a predictor by comparing it to the performance of a naive predictor which always predicts the mean of the model. A predictor that yields $R^2$ less than zero does no better than this naive predictor. As can be seen in FIG. 2C, there is greatly reduced conflation under noise when evaluating the series as a predictor when compared to the mean error measurements of FIG. 2B. Because the coefficient of determination potentially provides better insight into the performance of a classification against the model, it is a good candidate for the basis of a confidence metric of a rip placement.

That is, some cross S is only considered a rip if the following holds:

$$R^2(M_{rip}(S), P) \ge R^2_{th} \quad (4)$$

where $$R^2_{th}$$

is some given threshold of confidence.

3.3.2 Heuristic Technique for Detection

Equation 2 represents an optimization problem with an undefined high-dimensional parameter space. A generalized global optimization approach to solving such a problem is computationally infeasible. However, there are certain assumptions that can be made to allow for a heuristic approach for a reasonable local optimization:

1. Each rip labeling exhibits a local maxima at the cross point with high membership to the label.
2. Each rip labeling has an orientation.
3. The segment denoting the neck length is placed by this orientation.
4. The segment denoting the width of the neck is near orthogonal to this orientation.

Therefore, a detection heuristic that exploits these assumptions is presented. The general steps of the heuristic are as follows. First, find some group of pixels with a high average value that could be the cross point of a rip. Next, assume the central location of these pixels is a rip, and find its orientation. After this, place the vertices of the cross according to the orientation at the point where the labeling represents the rip's threshold. Then, evaluate the model of vertex placement against the underlying classification pixels to assess the goodness of fit. Furthermore, perform a local search for each of the initial vertex locations to find a better goodness of fit. If the goodness of fit is above a set threshold, a rip has been detected. If not, remove these pixels from the search and continue from the first step until all pixels of the classification have been assessed.

Figure 3:
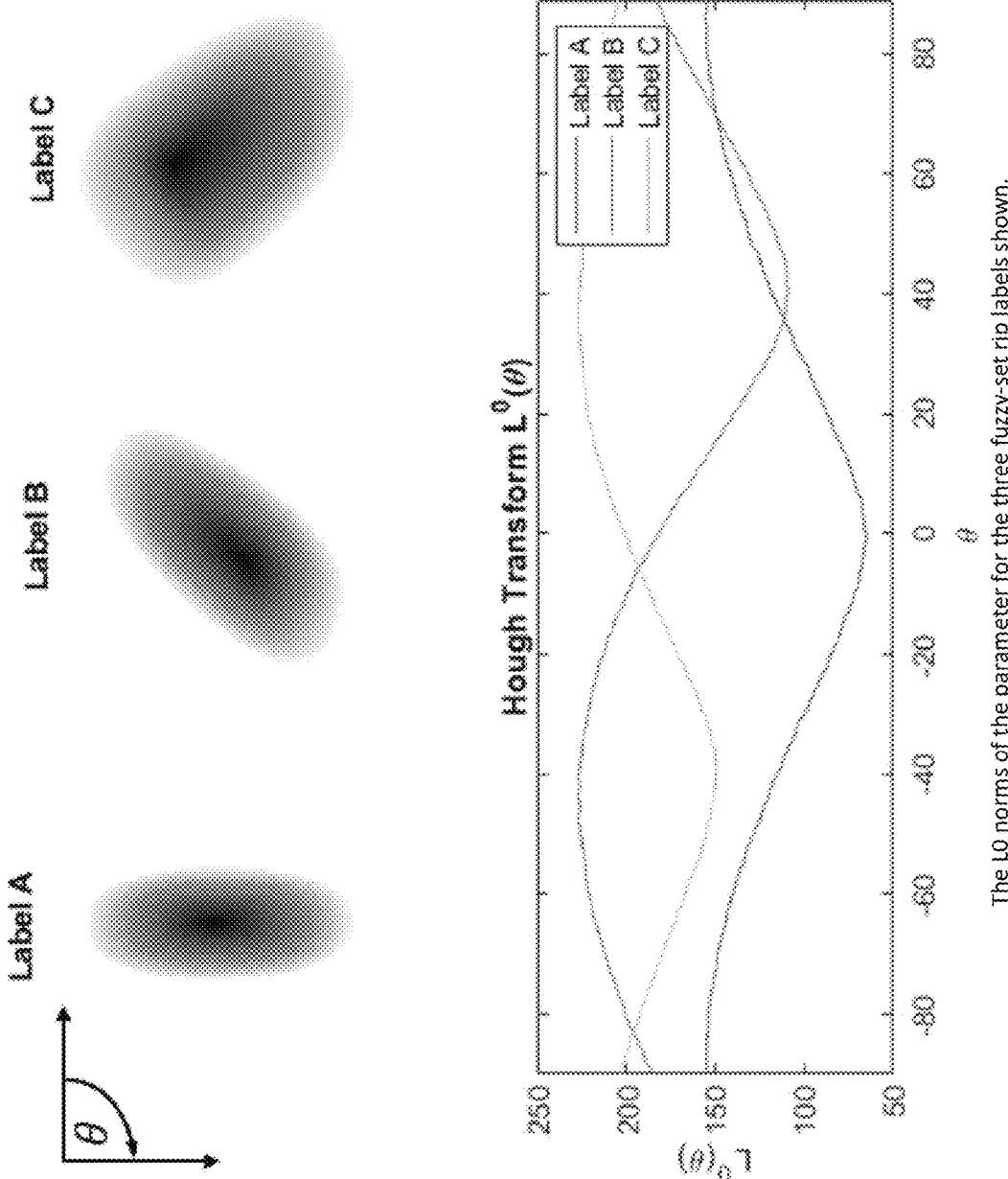
FIG. 3 illustrates example labels in accordance with disclosed aspects.

One or more steps from the heuristic described above involve orientation detection, initial vertex placement, and the local search for the best vertex positions after initialization. The algorithm presented to detect orientation of the rip is based on the Hough transform due to the versatility of its parameter space and its performance under noisy conditions [27, 28]. Given the classification of the pixels near the cross point as input, a Hough transform from a set of pixels near the cross point will reveal the orientation of the rip by choosing the angle with the highest $L^0$ norm of the parameter space. That is, the angle with the highest number of non-zero values for each corresponding orthogonal distance value within the parameter space. Three examples are shown in FIG. 3 as Labels A, B, and C. Because a Hough transform is computationally expensive and because we are fixing the cross point before finding the orientation, it is meaningful to save computation by performing a partial Hough transform considering only possible lines crossing through the pixels near the cross point. Furthermore, even more computation may be saved by only considering the crisp-set classification since the Hough transform detects orientation similarly in both the crisp and fuzzy-set cases. An algorithm for finding the orientation at a given cross point P for a crisp-set labeling is shown in Algorithm 2 (FIG. 7).

Figure 8:
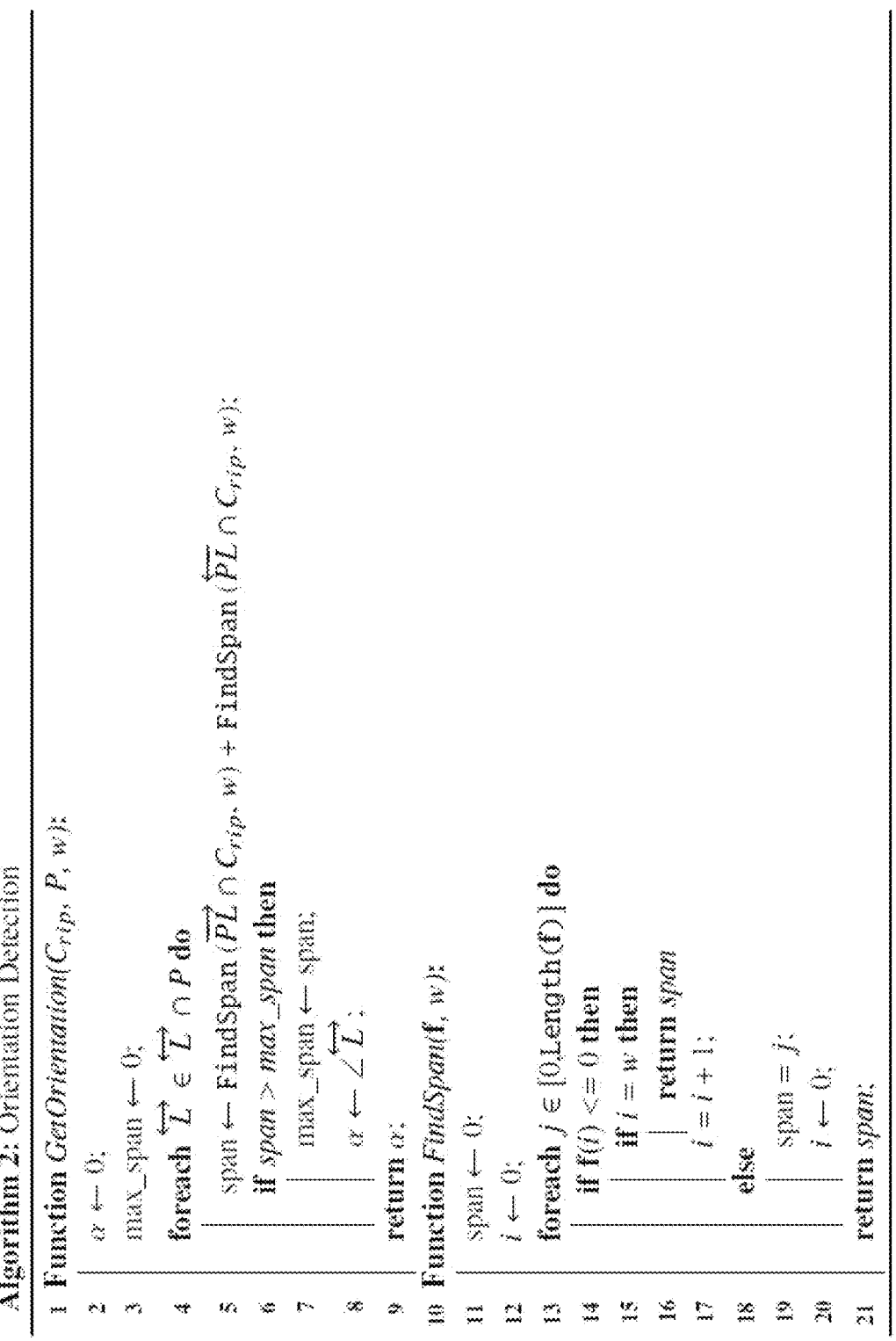
FIG. 8 illustrates an example algorithm in accordance with disclosed aspects.

Once the orientation is found, the segment of the rip may initially be placed orthogonal to this orientation. The vertices A and B will be placed along the angle of orientation while vertices C and D will be placed perpendicular to segment $\overline{AB}$ with the intersection of the two segments at P. In order to calculate a good initial placement for the vertices, the model for labeling is taken into account: If the vertices are placed on $\gamma_t$, we would expect the segments to contain labels greater than 0 for those pixels intersecting the segment while the pixels along the same line outside of the segment ($\overleftrightarrow{AB} \setminus \overline{AB}$) will tend to be less than 0. Assuming some level of noise in the labeling, it Is best to account for some mislabeled pixels when performing this initial placement. Therefore, the near-continuous vertex placement technique may be used to account for noise by examining a phase change using from negative labels to positive labels from P using some threshold w [26]:

$$\text{Minimum } j \text{ where } \sum_{k=j+1}^{j+w} C(k) = 0 \quad (5)$$

where the index j is defined by an ordering of pixels with respect to the vertex orientation from P as shown in Algorithm 2 (FIG. 8).

After the vertex locations are initialized, a local search may be performed in order to fine-tune the vertices of the cross to find a local maxima for the confidence from the initial position of the cross. After a local maxima is found, the confidence of the vertex placement is then used to evaluate the fitness of the model to the given classification. Ideally, if this fitness is above some threshold, the cross denotes a rip.

4. Implementation

The purpose of the proposed methodology is to provide a way to digitize, and henceforth label, rips in order to build a classifier for maximizing detection of unlabeled rips. Hence, it is necessary to describe an implementation where the presented novel labeling technique may be compared to a more intuitive and naïve technique. Therefore, a pixel-wise learning model for rips, or classifier, will now be described.

4.1 Learning Model

Our approach to learning supports a human-machine team and implements online machine learning; the labeling of rips is performed one-at-a-time and the model is updated after each rip digitization. Intuitively, this method constructs a learner that correlates to the spatiotemporal nuances of a particular site or imagery platform. Thus, the focus is not towards general-purpose rip recognition, but rather the automation of rip digitization for such a dataset.

A fuzzy K-nearest neighbors (KNN) classifier Is selected for the rip classifier, as its training time and classification time are trivial within a reasonable amount of labeled instances and feature spaces. Given the set of nearest neighbors $\{\vec{p}_k \forall k \in [1, K]\}$, classification is performed in the following way for any pixel j's feature vector $\vec{p}_j$:

$$C_{rip}(\vec{p_j}) = \sum_{k=1}^{K} \frac{2^{-d(\vec{p_j}, \vec{p_k})} \times C_{rip}(\vec{p_k})}{\sum_{k=1}^{K} 2^{-d(\vec{p_j}, \vec{p_k})}} \quad (6)$$

where $\{\vec{p}_k \forall k \in [1, K]\}$ is the Euclidean distance between $\vec{p}_j$ and $\vec{p}_k$ and $C_{rip}(\vec{p}_k)$ gives the label of neighbor $\vec{p}_k$. This technique for KNN represents a weighted average based on an inverse weighting scheme imposed by the Euclidean distance between the input vector and labeled instances.

4.2 Feature Space

The sometimes subjective and occasionally inconspicuous nature of identifying and denoting rips from optical imagery may lend itself towards an underfit learning model when using a basic feature space composed of basic color channels and pixel positions. Underfitting typically occurs when the feature space of the learning model is not rich enough to precisely classify the data of interest. Because the imagery features that make up a rip tend to be described using color and texture spatial patterns, a richer feature space derived from computer vision may be necessary for a convergent learning model. To explore the effects of more robust features for the techniques presented in this study, results for optimized feature sets are explored. Typically, these features are configured using parameters with relatively high dimensions. For instance, the texture detecting Gabor filter [29] requires at least 5 continuous-space parameters as input. As the best parameterization for a given labeled dataset may be impossible to find, an optimization technique that is robust in high dimensional spaces is used to yield a good parameterization [30].

A greedy algorithm is used to perform feature selection over an initial pool of color channel features (red, green, blue, and brightness), spatial features (pixel row and column), and convolutional texture-based features (scale space and Gabor filter). The greedy algorithm starts by scoring each feature in the pool. To do so, it verifies accuracy of a single-feature learning model whose feature space consists of the chosen feature given some labeled dataset. If the feature requires parameterization (e.g., the convolutional features), a Nelder-Mead simplex is used to find a good parameterization [30]. After each feature in the pool is analyzed by the greedy algorithm, it selects the best performing feature to add to its feature space. This repeats, with the algorithm increasing the feature space used for verification by the previously selected features, until the improvement of the greedy selection reaches some point of diminishing returns. This method of feature selection is commonly referred to as sequential feature selection [31].

4.3 Label Sampling

Upon selection of an instance-based learner such as KNN, it is important to make considerations regarding the instances on which the learning model is trained. In a naive implementation, training may be performed for every pixel of a correctly labeled image. This technique has two major drawbacks. First, it causes a loss in performance as instance-based learners, such as KNN, perform noticeably slower for very large instance counts. Second, this naive training technique can cause large amounts of bias towards negatively labeled pixels. This is due to the fact that in almost any situation, the rips will take up a small amount of the image's area. For instance, images with correctly labeled rips contain less than 5% positively labeled pixels within the dataset chosen for this study. In this case, there will most likely be a larger bias towards negatively labeled pixels since the population of negatively labeled pixels is at least 20 times larger.

To eliminate bias and maintain good performance, we choose to sample correctly labeled rips based on the cross-segment labeling scheme presented. A good mix will contain a random sampling of non-rip pixels throughout the image, and a more condensed sampling of positive and negative pixels within the model-labeled region. In some preliminary experiments, it was found that a good representative mix contained pixels such that 50% are sampled from the region within $\gamma_r$, 25% are sampled from within $\gamma_r \backslash \gamma_r$, and the remaining 25% are sampled from those remaining pixels labeled −1 throughout the image. This technique provides a reasonable way to create a sample that contains equal amount of positively and negatively labeled pixels while providing a good spatial representation of the labeled imagery.

5. Reduction to Practice

Disclosed aspects provide a reduction to practice example that compares crisp labeling to the proposed novel fuzzy-set labeling for a chosen learning model as well as the goodness-of-fit concept. In this section, a learning model trained on a single rip image in order to detect a rip from an image taken the following day will be evaluated in detail. This type of experiment presents insightful evidence since it elucidates issues involved with interactive machine learning.

Figure 4:
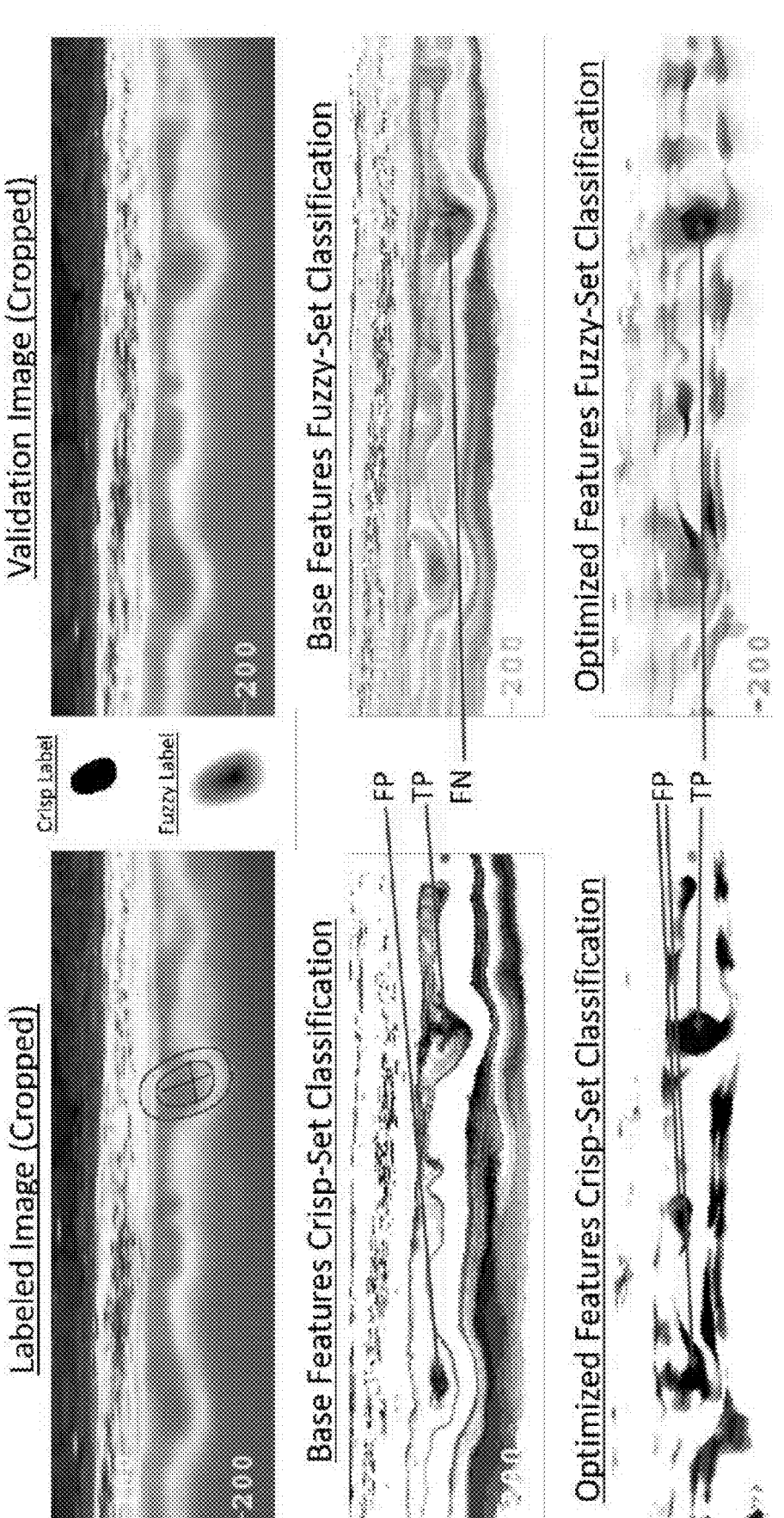
FIG. 4 illustrates examples of labeling and feature optimization in accordance with disclosed aspects.

FIGS. 4-6 illustrate examples of one or more embodiments of the disclosed procedure and results of the experiment.

The presented imagery dataset is derived from an Argus video monitoring system posted at the coast of Duck, N.C. [5]. This site was chosen based on the abundance of data available as well as the presence of both orthorectified imagery and along-shore imagery. The monitoring system is comprised of 5 cameras mounted to monitor about 3 miles of shoreline. Ten-minute time-averaged images are used for analysis as they are traditionally used to study rips. The images are 1334×334 pixels with a color depth of 32 bits per pixel.

The experiment was carried out by digitizing a rip with a cross. The image was then labeled and trained in the manner described in Section 4.3. The learning model described in Section 4.1 was then used to detect and automatically place the cross segment to annotate a rip in an image taken the following day. The heuristic for detection is described in Section 3.3.2. Experiments were conducted using two feature spaces: one representing basic features and one representing tuned features found by the optimization technique discussed in Section 4.2. Details of each feature space are shown in Table 1 shown in FIG. 9. Example training can be shown in FIG. 5

Evidence from the experiment(s) described herein shows that a combination of fuzzy-set labeling and feature optimization yields the most accurate results for rip classification. FIG. 4 shows images that illustrate the procedure and results of the experiment. All images within the figure have been cropped to the area of interest, though the full images were used in the experiment. The image on the top left shows the cross of the rip as placed by a human along with the model-generated root and threshold curves. The crisp-set and fuzzy-set labels are shown next, with white representing the label −1, black representing 1, and intermediate labels represented by their respective shades of gray. After labeling, the classifier was used to detect and place the rip annotation in the validation image at the top right. A true positive detection denotes that the threshold curve of the machine-placed cross intersects the ground-truth cross's threshold curve. However, this does not necessarily mean that the vertices of the cross segment have been placed correctly, so both the true-positive detection and the number of vertices correctly placed by the detection algorithm are discussed. The output of the full-pixel classifiers can be seen in the four remaining images. In the first of these images, crisp-set labeling with base features yielded one false positive before detecting a true positive rip, though only one vertex of the rip was placed correctly. When optimized features were used in crisp-set classification, the detection algorithm yielded 2 false positives before correctly detecting the rip, but all four vertices of the cross-segment needed correction. For the fuzzy-set labeling, the learning model utilizing base features did not detect any rips in the image, yielding a false negative. However, when the fuzzy-set labeling was used with optimized features, the detection algorithm correctly found the rip immediately, placing 2 vertices of the cross segment correctly.

Results for inverse mean absolute error (1/MAE), root mean squared error (1/RMSE), and coefficient of determination (CoD) for rip detection are shown in Table 2 illustrated in FIG. 10. The inverse of error is taken such that for all measurements: a higher value represents a higher confidence of a rip. In the fuzzy-set labeled experiment with the base feature set, the algorithm did not detect the rip, so the metrics for a manually placed annotation are shown and labeled as false negative. It is observed from the results that the fuzzy-set labeling with an optimized feature space yielded the highest confidence from the learning model for all three metrics.

CoD more appropriately distinguishes true values from false values. The difference of mean true values and mean false values for CoD is 0:11, while this difference is 0:01 for MAE and −0:1 for RMSE. Additionally, the CoD and, to a lesser degree, RMSE's true values for the optimized feature space were always larger than the false values for optimized feature sets, while the MAE did not exhibit this behavior.

According to some aspects, one or more disclosed embodiments may have one or more specific applications. For example, disclosed embodiments may be used to perform one or more water-based activities and/or operations. For example, optimized features can help with rip channel annotation, which can help identify rip currents. Disclosed embodiments may be used in ocean/water forecasts, for drift prediction, for search & rescue, and for acoustic modeling. Disclosed embodiments may be used for safety purposes, such as associated with equipment and/or personnel. According to some aspects, one or more disclosed aspects may be used to develop a mission route plan associated with operating a vessel. According to some aspects, one or more disclosed aspects may be used to facilitate a water-based operation. In some cases, one or more disclosed aspects may be used to facilitate a strategic operation, which can include a defensive tactical operation or naval operation. Disclosed embodiments (e.g., via the rip channel interface) can reduce workload, such as by an average of about 80%.

Figure 11:
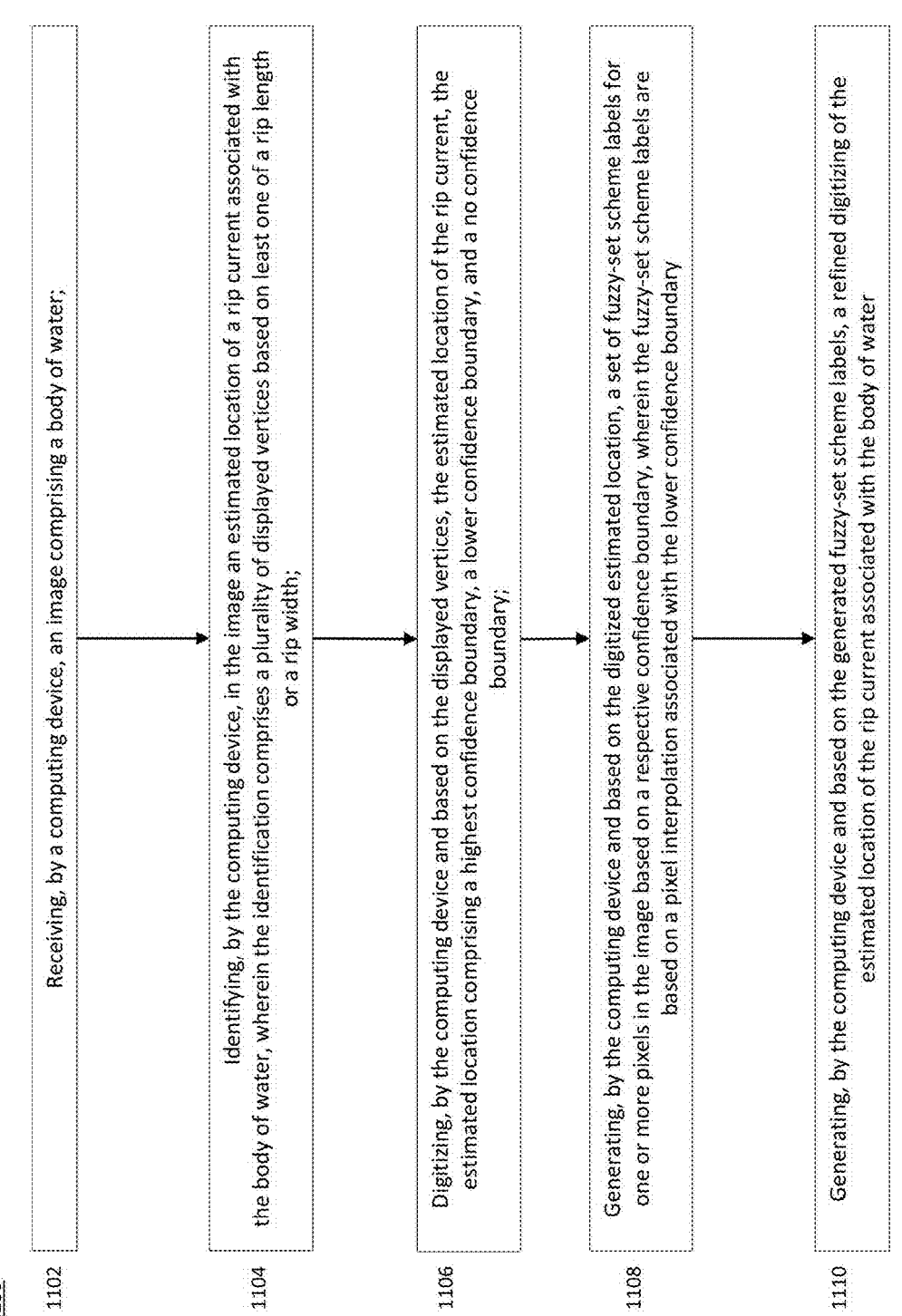
FIG. 11 illustrates an example method in accordance with disclosed aspects.

FIG. 11 illustrates an example method 1100, in accordance with one or more disclosed aspects. For example, method 1100 may be a method of identifying a rip current. Step 1102 may include receiving, by a computing device, an image comprising a body of water. Step 1104 may include identifying, by the computing device, in the image an estimated location of a rip current associated with the body of water, wherein the identification comprises a plurality of displayed vertices based on least one of a rip length or a rip width. Step 1106 may include digitizing, by the computing device and based on the displayed vertices, the estimated location of the rip current, the estimated location comprising a highest confidence boundary, a lower confidence boundary, and a no confidence boundary. Step 1108 may include generating, by the computing device and based on the digitized estimated location, a set of fuzzy-set scheme labels for one or more pixels in the image based on a respective confidence boundary, wherein the fuzzy-set scheme labels are based on a pixel interpolation associated with the lower confidence boundary. Step 1110 may include generating, by the computing device and based on the generated fuzzy-set scheme labels, a refined digitizing of the estimated location of the rip current associated with the body of water. One or more steps may be repeated, added, modified, and/or excluded.

Figure 12:
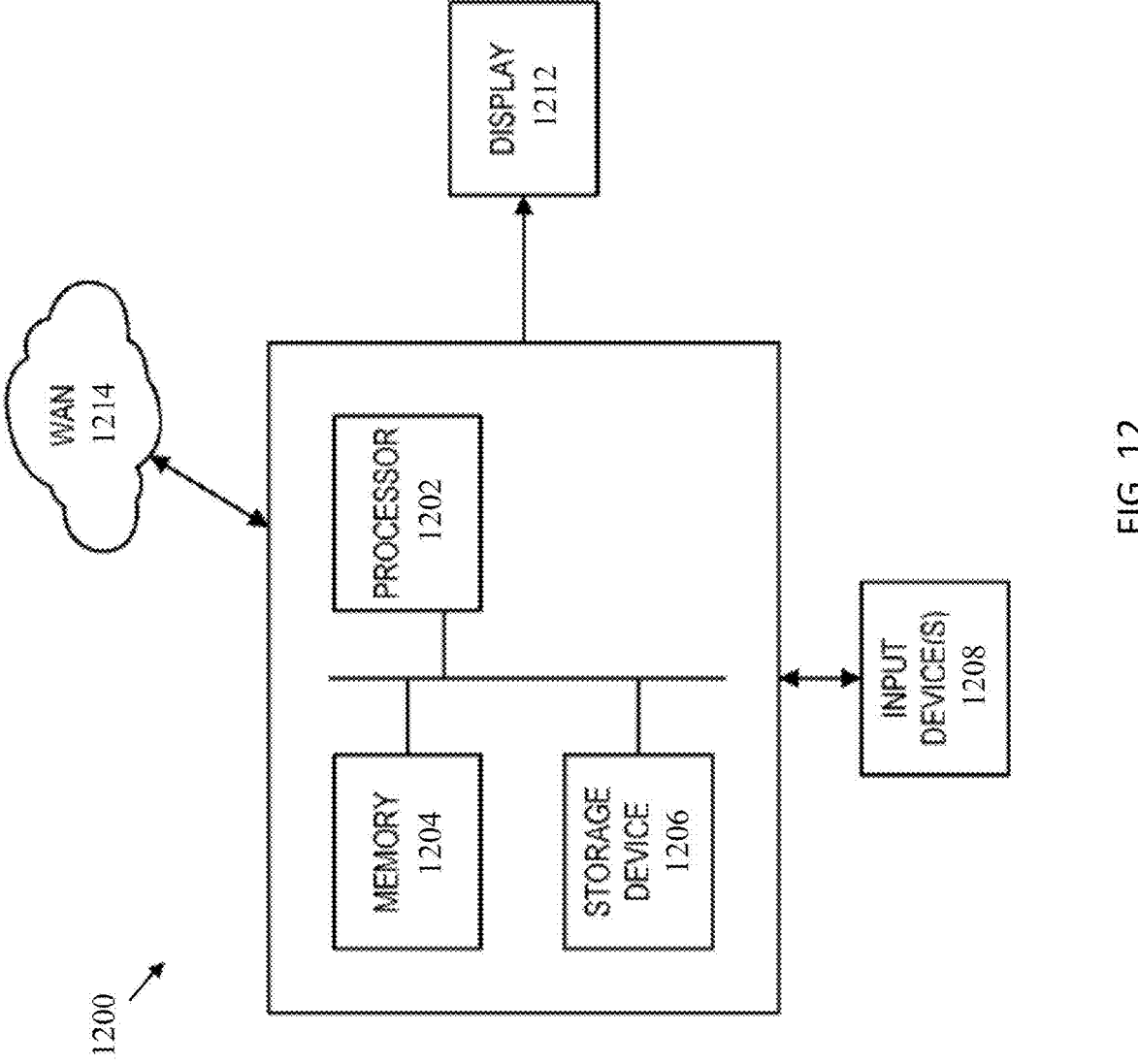
FIG. 12 illustrates an example computer system in accordance with disclosed aspects.

One or more aspects described herein may be implemented on virtually any type of computer regardless of the platform being used. For example, as shown in FIG. 12, a computer system 1200 includes a processor 1202, associated memory 1204, a storage device 1206, and numerous other elements and functionalities typical of today's computers (not shown). The computer 1200 may also include input means 1208, such as a keyboard and a mouse, and output means 1212, such as a monitor or LED. The computer system 1200 may be connected to a local may be a network (LAN) or a wide may be a network (e.g., the Internet) 1214 via a network interface connection (not shown). Those skilled in the art will appreciate that these input and output means may take other forms.

Further, those skilled in the art will appreciate that one or more elements of the aforementioned computer system 1200 may be located at a remote location and connected to the other elements over a network. Further, the disclosure may be implemented on a distributed system having a plurality of nodes, where each portion of the disclosure (e.g., real-time instrumentation component, response vehicle(s), data sources, etc.) may be located on a different node within the distributed system. In one embodiment of the disclosure, the node corresponds to a computer system. Alternatively, the node may correspond to a processor with associated physical memory. The node may alternatively correspond to a processor with shared memory and/or resources. Further, software instructions to perform embodiments of the disclosure may be stored on a computer-readable medium (i.e., a non-transitory computer-readable medium) such as a compact disc (CD), a diskette, a tape, a file, or any other computer readable storage device. The present disclosure provides for a non-transitory computer readable medium comprising computer code, the computer code, when executed by a processor, causes the processor to perform aspects disclosed herein.

Embodiments for methods and systems for the digitization and detection of rip currents within optical imagery by way of a fuzzy set have been described. Although particular embodiments, aspects, and features have been described and illustrated, one skilled in the art may readily appreciate that the aspects described herein are not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

REFERENCES

1. R. A. Holman, O. Symonds, E. B. Thornton, and R. Ranasinghe, "Rip spacing and persistence on an embayed beach," *Journal of Geophysical Research: Oceans* 111 (C1)(2006), doi: 10.1029/2005JC002965, URL https://agupubs.onlinelibrary.wiley.com/doi/abs/10.1029/2005JC002965.

2. J. MacMahan, J. Brown, J. Brown. E. Thornton, A. Reniers, T. Stanton, M. Henriquez, E. Gallagher, J. Morrison, M. J. Austin, T. M. Scott, and N. Senechal, "Mean Lagrangian flow behavior on an open coast rip-channeled beach: A new perspective," *Marine Geology* 268 (1), 1-15 (2010), ISSN 0025-3227, doi: https://doi.org/10.1016/j.margeo.2009.09.011. URL http://www.sciencedirect.com/science/article/pii/S0025322709002618.

3. S. Pitman, S. Gallop, L Haigh, S. Mahmoodi, G. Masselink, and R. Ranasinghe, "Synthetic Imagery for the Automated Detection of Rip Currents. 01 2016. doi: 10.2112/5175-183.1.

4. S. Gallop. K. Bryan, S. Pitman, R. Ranasinghe, and D. Sandwell, "Rip current observations on a low-sloping dissipative beach, 09 2015. doi: 10.13140/RG.2.1.5065.7761/1.

5. R. A. Holman and J. Stanley, "The history and technical capabilities of Argus," *Coastal engineering* 54 (6-7), 477-491 (2007).

6. C. Maryan, M. T. Hoque, C. Michael, E. loup, and M. Abdelguerfi, "Machine learning applications in detecting rip channels from images," *Applied Soft Computing* 78, 84-93 (2019), ISSN 1568-4946, doi: https://doi.org/10.1016/j.asoc.2019.02.017. URL http://www.sciencedirect.com/science/article/pii/S1568494619300778.

7. B. Castelle, T. Scott, R. Brander, and R. McCarroll. "Rip current types, circulation and hazard," Earth-Science Reviews 163, 1-21 (2016).

8. M. Moulton, S. Elgar, and B, Raubenheimer, "Improving the time resolution of surfzone bathy metry using in situ altimeters," *Ocean Dynamics* 64 (5), 755-770 (2014).

9. M. Moulton, S. Elgar, B. Raubenheimer, J. C. Warner, and N. Kumar, "Rip currents and alongshore flows in single channels dredged in the surf zone." *Journal of Geophysical Research: Oceans* 122 (5), 3799-3816 (2017), doi:

10.1002/2016JC012222. URL https://agupubs.onlinelibrary.wiley. com/doi/abs/10.1002/2016JC012222.

10. N. Bruneau, B. Castello, P. Bonne on, R. Pedreros, R. Almar, N. Bonneton, P. Bretel, J. P. Parisot, and N. Sénéchal, "Field observations of an evolving rip current on a meso-macrotidal well-developed inner bar and rip morphology," *Continental Shelf Research* 29 (14), 1650-1662 (2009)

11. J. H. MacMahan, E. B. Thornton, T. P. Stanton, and A. J. Renters, "RIPEX: Observations of a rip current system," *Marine Geology* 218 (1-4), 113-134 (2003).

12. R. Holman and M. C. Haller, "Remote sensing of the nearshore," *Annual of marine science* 5, 95-113 (2013)

13. G. Klir and B. *Yuan, Fuzzy and* 23 *logic,* volume 4 (Prentice hall ¥ Jersey, 1995).

14. J. M. Keller, M. R. Gray, and J. A. Givens, "A fuzzy k-nearest neighbor algorithm," *IEEE transactions on systems, man, and cybernetics* (4), 580-585 (1985)

15. T. C. Lippmann and R. A. Holman, "Quantification of sand bar morphology: A video technique based on wave dissipation," *Journal of Geophysical Research: Oceans* 94 (C1), 995-1011 (1989).

16. J.H. MacMahan, E. B. Thornton, A.J. Rex, T.P. Stanton, and G. Symonds, "Low-energy rip currents associated with small bathymetric variations," *Marine Geology* 255 (3-4), 156-164 (2008)

17. G. Wang, W. LI, M. A. Zaluaga R. P. A. Patel, M. Aertsen, T. Doel, A. L. David, J. Deprest, S. Ourselin, et al., "Interactive medical Image segmentation using deep learning with image-specific fire tuning" *IEEE transactions on medical imaging* 37 (7), 1562-1573 (2018).

18. T. V. Spina, P. A. de Miranda, and A. X. Falcão, "Hybrid approaches for interactive image segmentation using the live markers paradigm," *IEEE Transactions on Image Processing* 23 (12), 5756-5769 (2014).

19. D. Acana, H. Ling A. Kar and S. Fidler, "Efficient Interactive annotation of segmentation datasets with polygon-rnn++," Proceedings of the Proceedings of the IEEE conference Computer Vision and Pattern Recognition, 2018, p. 859-868.

20. H. Ling, J. Gao, A. Kar, W. Chen, and S. Fidler, "Fast Interactive obj act annotation with curve-gen," Proceeding of the Proceedings of the IEEE/CVF Conference on Computer Vision and Pattern Recognition, 2019, pp. 3257-5266.

21. J. Bragantini, B. Moura, A. X. Falcão, and F. A. Cappabianco, "Grabber: A tool to improve convergence in interactive image segmentation," *Pattern Recognition Letters* 140, 267-273 (2020).

22. S. L. Gallop, K. Bryan, and G. Coco, "Video observations of rip currents on an embayed beach," *Journal of coastal research* pp. 49.53 (2009)

23. S. Gallop, K. Bryan, G. Coco, and S. Stephens, "Storm-driven changes in rip channel pat-wins on an embayed beach," *Geomorphology* 127 (3), 179-188 (2011), ISSN 0169-555X, doi: https://doi.org/10.1016/j.geomorph.2010.12.014. URL http://www.sciencedirect. com/science/article/pii/S0169555X10805453.

24. A. H. Rachid, L. Razzak, M. Tanveer, and A. Robles-Kelly, "RipNet: A Lightweight One-Class Deep Neural Network for the Identification of RIP Currents," Proceedings of the International Conference on Neural Information Processing (Springer), 2020, pp. 172-179.

25. W. Böhm, O. Farin, and J. Kahmann, "A survey of curve and surface methods in CAGD," *Computer Aided Geometric Design* 1(1), 1-60 (1984).

26. C. J. Michael, S. M. Dennis, C. Maryan, S. Irving, and M. L. Palmsten, "A General Framework for Human-Machine Digitization of Geographic Regions from Remotely Sensed Imagery," Proceedings of the Proceedings of the 27th ACM SIGSPATIAL International Conf enc on Advances In Geographic Information Systems, SIGSPATIAL '19, New York, NY, USA (Association for Computing Machinery), 2019, p. 259-268. ISBN 9781450369091, doi: 10.1145/3347146.3359370. URL https://doi.org 10.1145/3347146.3359370.

27. R. Mclaughlin and M. Alder, "The Hough transform versus the UpWrite," *IEEE Transactions Pattern Analysis and Machine Intelligence* 20(4), 396-400 (1998), doi: 10.1109/34.677267.

28. R. O. Duda and P. E. Hart, "Use of the Hough transformation to detect lines and curves in pictures, *Communications of the ACM* 15(1), 11-15 (1972).

29. T. P. Weldon, W. E. Higgins, and D. F. Dann, "Efficient Gabor filter design for texture segmentation, *Pattern recognition* 29(12), 2005-2015 (1996).

30. J. A. Nelder and R. Mead, "A simplex method for function optimization," *Computation J* 7, 308-313 (1965).

31. D. W. Aha and R. L. Bankert, "A comparative evaluation of sequential feature selection algorithms," in *Learning from data*, pp. 199-206 (Springer, 1996).

32. C. J. Michael, "Human-Attuned Machine Learning for Coastal Region Annotation via the Geospatial Region Annotation-Interface Toolkit," Proceedings of the AGU Fall Meeting Abstracts, volume 2018, 2018, pp. EP54B-33.

What is claimed is:

1. A method of identifying a rip current, comprising:
receiving, by a computing device, an image comprising a body of water;
identifying, by the computing device, in the image an estimated location of a rip current associated with the body of water, wherein the identification comprises a plurality of displayed vertices based on least one of a rip length or a rip width;
digitizing, by the computing device and based on the displayed vertices, the estimated location of the rip current, the estimated location comprising a highest confidence boundary, a lower confidence boundary, and a no confidence boundary;
generating, by the computing device and based on the digitized estimated location, a set of fuzzy-set scheme labels for one or more pixels in the image based on a respective confidence boundary, wherein the fuzzy-set scheme labels are based on a pixel interpolation associated with the lower confidence boundary; and
generating, by the computing device and based on the generated fuzzy-set scheme labels, a refined digitizing of the estimated location of the rip current associated with the body of water,
wherein identifying the estimated location comprises generating a cross-segment of a segment of the rip length and a segment of the rip width, wherein the cross-segment comprises four vertices associated with the rip length and the rip width and is used to digitize the rip current.

2. The method of claim 1, wherein the digitizing comprises using a machine learning model to digitize the estimated location.

3. The method of claim 1, wherein generating the refined digitizing of the estimated location comprises using a machine learning model to digitize the estimated location.

4. The method of claim 1, further comprising closing one or more Bezier curves around the vertices, wherein generating the set of fuzzy-set scheme labels is based on the one more Bezier curves.

5. The method of claim 1, further comprising closing one or more Bezier curves around endpoints of the cross-segment, wherein generating the set of fuzzy-set scheme labels comprises gradually decreasing fading the fuzzy labels from a cross point of the cross-segment.

6. The method of claim 1, further comprising determining an orientation of the rip current based on one or more angles associated with the cross-segment.

7. The method of claim 1, further comprising determining an orientation of the rip current via feature extraction of the fuzzy-set labeling.

8. The method of claim 1, wherein generating the set of fuzzy-set scheme labels comprises one or more of the following: cross-point detection, orientation detection, initial vertex placement, or vertex placement optimization.

9. The method of claim 8, wherein cross-point detection comprises a thresholded local maxima, orientation detection comprises a partial Hough transform, initial vertex placement comprises a local search for a rough boundary associated with the rip current, and vertex placement optimization comprises a local max coefficient of determination.

10. The method of claim 1, further comprising performing a water-based operation based on the refined digitizing of the estimated location of the rip current associated with the body of water.

11. The method of claim 1, wherein generating the set of fuzzy-set scheme labels comprises identifying an orientation associated with the rip current.

12. The method of claim 1, wherein the image comprises a satellite image.

13. The method of claim 1, wherein the image comprises a photograph.

14. The method of claim 1, wherein digitizing the estimated location of the rip current comprises generating (1) a cross point pixel denoting an area of rip current with highest confidence, (2) a threshold curve designating a rough boundary of pixels of the rip current, and (3) a root curve designating pixels of the image outside of the rip current.

15. The method of claim 1, further comprising training a classifier based on input from a user, the input from the user being associated with the identified estimated location of a rip current and the digitized estimated location.

16. The method of claim 15, further comprising generating, via the classifier, the refined digitizing of the estimated location of the rip current associated with the body of water.

* * * * *